United States Patent [19]
Beauchane

[11] 3,875,510
[45] Apr. 1, 1975

[54] SYNCHRO TESTING CALIBRATING DEVICE

[75] Inventor: Jerome R. Beauchane, Del Mar, Calif.

[73] Assignee: The United States of America as represented by the Secretary of the Navy, Washington, D.C.

[22] Filed: Oct. 5, 1973

[21] Appl. No.: 405,718

[52] U.S. Cl. ............................ 324/158 SY, 324/51
[51] Int. Cl. ............................................ G01R 31/02
[58] Field of Search............324/158 SY, 158 SM, 324/158 MG, 51, 107; 340/268

[56] References Cited
UNITED STATES PATENTS

| | | |
|---|---|---|
| 2,402,108 | 6/1946 | Willard ........................ 324/158 SY |
| 2,625,599 | 1/1953 | Downes ....................... 324/158 SY |
| 2,675,542 | 4/1954 | Kress ............................ 324/158 SY |
| 3,111,613 | 11/1963 | Harper et al ...................... 324/51 |
| 3,293,548 | 12/1966 | Hunt ............................ 324/158 SY |
| 3,395,350 | 7/1968 | Harac ........................... 324/158 SY |

Primary Examiner—Maynard R. Wilbur
Assistant Examiner—G. E. Montone
Attorney, Agent, or Firm—R. S. Sciascia; G. J. Rubens; T. M. Phillips

[57] ABSTRACT

A device for calibrating and trouble shooting servo systems. Single and thirty-six speed test synchro receivers are connected to the servo systems by means of reversing switches and no external source of voltage is required for the test equipment.

2 Claims, 2 Drawing Figures

SYNCHRO TESTING CALIBRATING DEVICE

BACKGROUND OF THE INVENTION

Prior devices for testing and calibrating servo systems have been of the analog meter type which were very sensitive to line voltage fluctuations and thereby needed constant calibrating during a given test. Also they did not provide a readily available means for locating malfunctions of the servo system such as lead reversal, open or short circuits. Also it was difficult to maintain the desired accuracy of six minute transmission, especially where only the single speed indicator was used.

SUMMARY OF THE INVENTION

The present invention provides a means for calibrating and trouble shooting servo systems. Single and thirty-six speed servo systems may be serviced without the use of a separate power source by the parallel connecting of a hook-up cable between the servo system under test and the indicator unit. Switching means provide for independently reading single and thirty-six speed servo systems. The switching means also provide for isolating synchro lead reversals, opens, shorts and other casualities. This device is not sensitive to voltage fluctuations and need not be recalibrated during any prolonged test.

OBJECTS OF THE INVENTION

Accordingly, an object of the invention is the provision of an improved synchro indicator for calibrating and trouble shooting servo systems.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
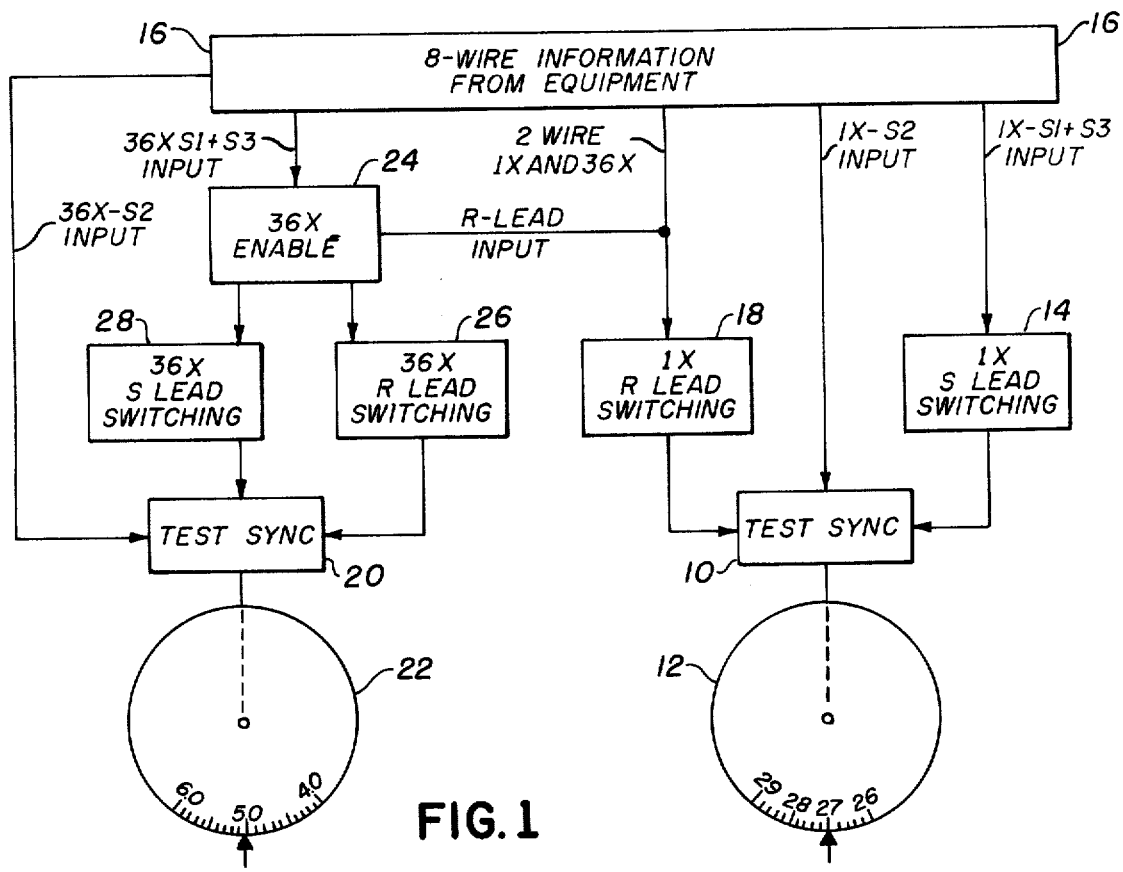
FIG. 1 is a block diagram of a synchro indicator system embodying the invention.

Referring now to FIG. 1 there is shown a single speed synchro receiver 10 driving an indicator dial 12. The S1 and S3 leads of synchro 10 are connected through a reversing switch 14 to a terminal block 16. The S2 lead is connected directly from terminal block 16 to synchro receiver 10. The single speed reference voltage is connected from terminal block 16 through reversing switch 18.

Figure 2:
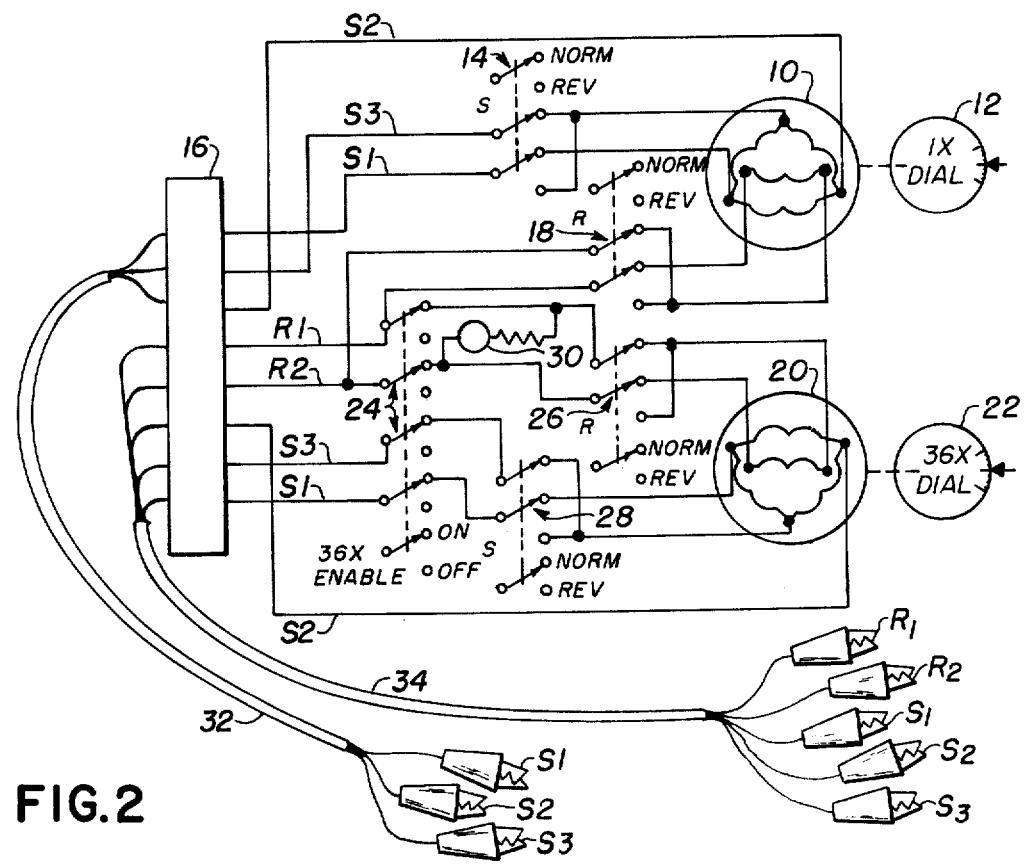
FIG. 2 is a schematic diagram of the embodiment of FIG. 1.

For testing and calibrating a thirty-six speed servo system, synchro receiver 20 driving a thirty-six speed indicator dial 22 is used. The reference lead input is taken from the same reference voltage input to terminal board 16 and is connected to synchro receiver 20 through an enabling switch 24 and lead reversing switch 26. The S1-S2 inputs are connected from terminal board 16 to synchro receiver 20 through enabling switch 24 and lead reversing switch 28. The S2 input lead is connected directly from terminal block 16 to synchro receiver 20. An indicator light 30 is provided to indicate when the thirty-six speed synchro 20 is enabled. As shown in FIG. 2, two multiple lead cables 32 and 34 are provided for connecting the device to the particular system under test. Cable 32, which is used for the single speed system has only three lead wires since the reference voltage is the same for both the single speed and the thirty-six speed systems being tested.

In operation, each of the clip-connectors of cables 32 and 34 are connected to the appropriate terminal of the system being tested. The R normal/reverse switches 18 and 26 will independently reverse the synchro receiver dials 12 or 22 by 180°. The S normal/reverse switches 14 and 28 will independently reverse the S1-S3 leads of synchro receiver 10 and 20 causing dials 12 and 22 to reverse direction of rotation from the corresponding synchro under test. An operator then has the capability of locating any synchro lead reversal or casualty without disconnecting the unit and reconnecting the leads numerous times. Single speed dial 12 should be engraved from 0° to 350° in 2.00° increments. The thirty-six speed dial 22 should be engraved from 0° to 10° in 0.10° increments.

Obviously many modifications and variations of the present invention are possible in the light of the above teachings. It is therefore to be understood that within the scope of the appended claims the invention may be practiced otherwise than as specifically described.

What is claimed is:

1. An improved synchro testing and calibrating device comprising:
   a. a first synchro receiver having a single speed indicator dial,
   b. a second synchro receiver having a thirty-six speed indicator dial,
   c. cable connector means adapted to be connected to a synchro system under test, said cable connector means including a first set of three stator winding leads for connection to single speed servos, a second set of three stator winding leads for connection to thirty-six speed servo and a pair of common reference voltage leads,
   d. switch circuit means connected to said cable connector means and to said first and second synchro receivers for selectively connecting either of said receivers to said synchro system under test for calibrating and line testing and including means for reversing two stator leads of each set of stator leads and for separately reversing the reference voltage leads of both synchro receivers.

2. The device of claim 1 wherein said switch circuit means includes,
   a. a first switch having a normal and a reverse position in line between the first set of stator terminal leads and the stator windings of said first synchro receiver,
   b. a second switch having a normal and a reverse position in line between the reference voltage leads and the rotor winding of said first synchro receiver,
   c. a third switch having a normal position and a reverse position in line between the second set of stator leads and the stator windings of said synchro receiver,
   d. a fourth switch having a normal position and a reverse position in line between the reference voltage leads and the rotor winding of said second synchro receiver,
   e. a fifth switch having on and off positions connected in circuit with said reference voltage leads, said thirty-six speed leads and the rotor and stator windings, respectively, of said second synchro receiver.

* * * * *